(12) United States Patent
Schneider et al.

(10) Patent No.: US 12,545,395 B2
(45) Date of Patent: Feb. 10, 2026

(54) AIRCRAFT ASSEMBLY

(71) Applicant: Airbus Operations Limited, Bristol (GB)

(72) Inventors: Stephan Olexander Schneider, Bristol (GB); Benjamin Nash, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 18/916,010

(22) Filed: Oct. 15, 2024

(65) Prior Publication Data

US 2025/0121928 A1    Apr. 17, 2025

(30) Foreign Application Priority Data

Oct. 17, 2023    (GB) ...................................... 2315869

(51) Int. Cl.
*B64C 7/00*    (2006.01)

(52) U.S. Cl.
CPC ...................... *B64C 7/00* (2013.01)

(58) Field of Classification Search
CPC .... B64C 7/00; B64C 9/14; B64C 3/28; B64C 9/02
See application file for complete search history.

(56) References Cited

U.S. PATENT DOCUMENTS

| | | | |
|---|---|---|---|
| 8,919,703 | B2 | 12/2014 | Parker |
| 10,501,166 | B2 | 12/2019 | Balzer |
| 11,142,299 | B2 | 10/2021 | Tsai |
| 2017/0167610 | A1* | 6/2017 | Blades ................... F16J 15/021 |
| 2018/0172159 | A1* | 6/2018 | Jaggard .................... B64C 7/00 |

FOREIGN PATENT DOCUMENTS

| | | | |
|---|---|---|---|
| CN | 216468431 U | 5/2022 | |
| DE | 602005002761 T2 * | 7/2008 | .............. B64C 1/12 |
| DE | 102022002158 B3 | 3/2023 | |
| EP | 0947421 A1 | 10/1999 | |
| EP | 3495259 A1 | 6/2019 | |
| ES | 2370129 T3 * | 12/2011 | .............. B64C 7/00 |
| GB | 1010042 A | 11/1965 | |
| WO | 8402691 A1 | 7/1984 | |

OTHER PUBLICATIONS

United Kingdom Intellectual Property Office Search and Examination Report in GB Application No. 2315869.4, dated Mar. 20, 2024, 7 pages.

* cited by examiner

*Primary Examiner* — Joshua D Huson
*Assistant Examiner* — Anna L. Gordon
(74) *Attorney, Agent, or Firm* — KDW Firm PLLC

(57) ABSTRACT

An aircraft assembly includes an aircraft structure, a flexible panel having a supported end fixedly attached to the aircraft structure, wherein the flexible panel is configured to bend about the supported end relative to the aircraft structure, a rigid stopper extending from and fixedly attached to the aircraft structure, wherein the rigid stopper is configured to restrict bending of the flexible panel about the supported end in a first direction and permit bending of the flexible panel in a second direction opposing the first direction.

18 Claims, 5 Drawing Sheets

AIRCRAFT ASSEMBLY

FIELD OF THE INVENTION

The present invention relates to an aircraft assembly, and an aircraft comprising the aircraft assembly.

BACKGROUND OF THE INVENTION

The outer aerodynamic panels of aircraft are typically fixed on multiple sides, attaching to fixed internal structures of the aircraft such as ribs and spars, thereby restricting movement to localised wing bending. In some circumstances, it may be desirable to provide a panel that is able to bend independently of localised wing bending, for example due to aerodynamic considerations, and this can require careful management of the overall permissible movement of the panel to prevent interference with internal components, clashes with other moveable structures of the aircraft such as control surfaces, and to avoid any unintended aerodynamic effects.

SUMMARY OF THE INVENTION

A first aspect of the invention provides an aircraft assembly comprising: an aircraft structure: a flexible panel having a supported end fixedly attached to the aircraft structure, wherein the flexible panel is configured to bend about the supported end relative to the aircraft structure: a rigid stopper extending from and fixedly attached to the aircraft structure: wherein the rigid stopper is configured to restrict bending of the flexible panel about the supported end in a first direction and permit bending of the flexible panel in a second direction opposing the first direction.

This can allow the flexible panel to have some limited flexibility, with the limit of that flexibility dictated by the rigid stopper. This allows the flexible panel to be simply constructed, as well as being simply supported so as to be able to passively move between undeformed and bent configurations.

The aircraft assembly may comprise a moveable device for deploying relative to an outer aerodynamic skin panel of an aircraft, the moveable device having a retracted configuration in which the moveable device contacts the flexible panel to form a seal therebetween and a deployed configuration in which the moveable device is spaced from the flexible panel, wherein contact between the flexible panel and moveable device in the retracted configuration is limited by the rigid stopper.

This can help ensure the flexible panel is able to form a seal with the moveable device in the retracted configuration, whilst helping ensure the moveable device is able to move from the deployed configuration to the retracted configuration without catching on an end of the flexible panel. The rigid stopper can help to stabilise the flexible panel and reduce any undesirable effects of aerodynamic loads, such as flutter. The rigid stopper may alter the natural resonant frequency of the flexible panel, potentially shifting the resonant frequency to a less disruptive frequency. This can improve aerodynamics, as well as reduce fatigue or other cyclic stresses on the flexible panel.

The moveable device may be a control surface for an aircraft.

The rigid stopper and flexible panel arrangement can be particularly beneficial for control surfaces that are expected to move between deployed and retracted configurations in-flight, as the seal formed by the flexible panel reduces drag whilst the rigid stopper helps prevent the flexible panel catching on the control surface during retraction.

The control surface may be a flap or slat.

Flaps and slats are examples of control surfaces that are retracted in cruise, and thereby may particularly benefit from the seal that may be formed with the control surface during this flight phase. The curved deployment path often encountered for flaps may be particularly relevant in the present context due to the difficulties that can present in avoiding clashes between the flexible panel and flap during retraction.

The aircraft structure may be an outer aerodynamic skin panel.

By attaching the flexible panel to an outer aerodynamic skin panel, the ease of alignment of the flexible panel with the outer aerodynamic skin panel can be improved.

The flexible panel may form a substantially continuous aerodynamic surface with the outer skin panel.

This can improve the aerodynamics across the outer skin panel and flexible panel.

The flexible panel may have an undeformed configuration in which a tip region of the flexible panel opposite to the supported end is spaced from the rigid stopper.

The flexible panel can thereby move in both directions relative to the rigid stopper. The spacing can provide a clearance for accommodating movement of, e.g., the moveable device during retraction from the deployed configuration, whilst allowing the clearance to be reduced during the retracted configuration to seal the gap.

A distal portion of the flexible panel may extend beyond the rigid stopper so as to be unconstrained by the rigid stopper.

This can allow a portion of the flexible panel to bend freely beyond the rigid stopper, which can assist in forming the seal with a moveable device.

The rigid stopper may be attached to the flexible panel.

This can help ease assembly by reducing the number of components that might need to be attached to the aircraft, as well as ensuring the components share a common datum and thereby improve accuracy of the permitted degree of bending allowed by the rigid stopper. This arrangement may also improve packaging of the components.

The rigid stopper may be fastened to the aircraft structure using a plurality of fasteners.

These fasteners make installation and removal of the rigid stopper easier as the connection is releasable. The rigid stopper can thereby be removed for repair or replacement more easily.

The flexible panel may be fastened to the aircraft structure using a plurality of fasteners.

This can provide for easier installation and removal of the flexible panel.

The flexible panel and rigid stopper may be fastened to the aircraft structure using a plurality of fasteners, each fastener extending through the flexible panel and rigid stopper.

The flexible panel and rigid stopper are thereby attached to the aircraft structure using the same fasteners, which can make installation easier.

Each fastener may have a fastener head that abuts a surface of the rigid stopper.

By abutting the fastener head to a surface of the rigid stopper, the rigid stopper can be removed from the aircraft assembly without removing the flexible panel. This can help with access and removal of the rigid stopper in the event of repair, modification or replacement.

The rigid stopper may comprise one or more reinforcement ribs extending in a direction aligned with a bending axis of the flexible panel that extends from the supported end of the flexible panel to the tip region of the flexible panel.

The reinforcement ribs can strengthen the rigid stopper along the bending axis of the rigid stopper. This can increase the bending stiffness of the rigid stopper in a more weight efficient manner than otherwise possible.

The rigid stopper may have a width that increases in a direction extending from the supported end of the flexible panel to a tip region of the flexible panel opposing the supported end.

With this arrangement, the rigid stopper can extend across a greater width of the flexible panel in the vicinity of where the flexible panel will contact the rigid stopper. This can increase the effectiveness of the rigid stopper in preventing undesired deflection across a greater width of the flexible panel.

The flexible panel may decrease in thickness in a direction extending from the supported end of the flexible panel to a tip region of the flexible panel opposing the supported end.

Increased flexibility may be desired towards the tip region to allow the aerodynamic forces to move the tip region of the flexible panel. The decrease in thickness can increase the flexibility of the flexible panel towards this tip region.

A further aspect of the invention provides an aircraft comprising the aircraft assembly.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
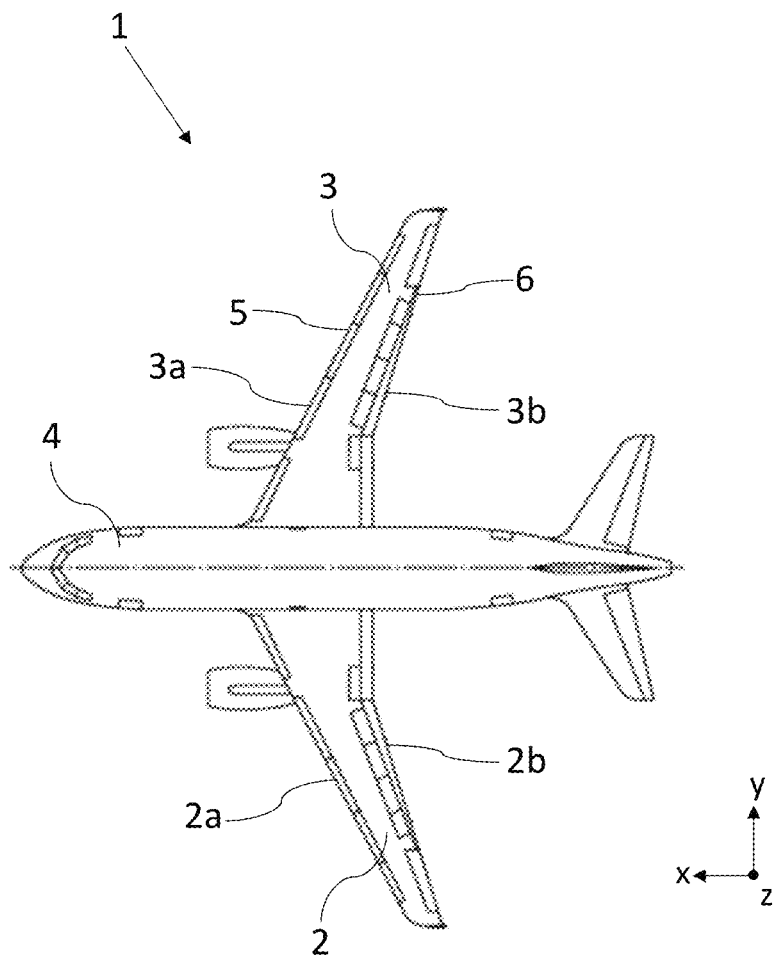
FIG. 1 shows an aircraft.

FIG. 1 illustrates a typical fixed wing aircraft 1 having a port wing 2 and starboard wing 3, the wings 2, 3 extending from a fuselage 4 along the y-direction shown in FIG. 1. Each wing has a leading edge 5 and a trailing edge 6. The aircraft 1 is a typical jet passenger transport aircraft but the invention is applicable to a wide variety of fixed wing aircraft types, including commercial, military, passenger, cargo, jet, propeller, general aviation, etc. with any number of engines attached to the wings or fuselage.

The axes shown in FIG. 1 represent the usual reference orthogonal axes of the aircraft 1. The X-axis defines the longitudinal fore-aft direction of the aircraft, the Y-axis defines the spanwise direction and the Z-axis defines the vertical up-down direction of the aircraft.

In the following description, the terms "forward" or "front" refers to locations towards a leading edge 5 of the wings 2,3, in the x-direction shown in FIG. 1, and the terms "rear", or "aft" refer to components towards a trailing edge 6 of the wings 2,3. The position of features may be construed relative to other features, for example a forward component may be disposed on a forward side of another component, but towards the rear of the aircraft 1. Similarly, the terms "upper" and "lower" refer to the position of features relative to other features such as an upper surface and lower surface of the wings 2,3, and in accordance with a normal orientation of the aircraft 1, and as indicated by the z-direction in FIG. 1.

Each wing 2, 3 of the aircraft 1 is aft-swept and has a cantilevered structure with a span extending in a span-wise direction from a root to a tip, the root being joined to the aircraft fuselage 4. The wings 2,3 have a chord extending in a chordwise direction from the leading edge 2a, 3a to the respective trailing edge 2b, 3b.

Figure 2:
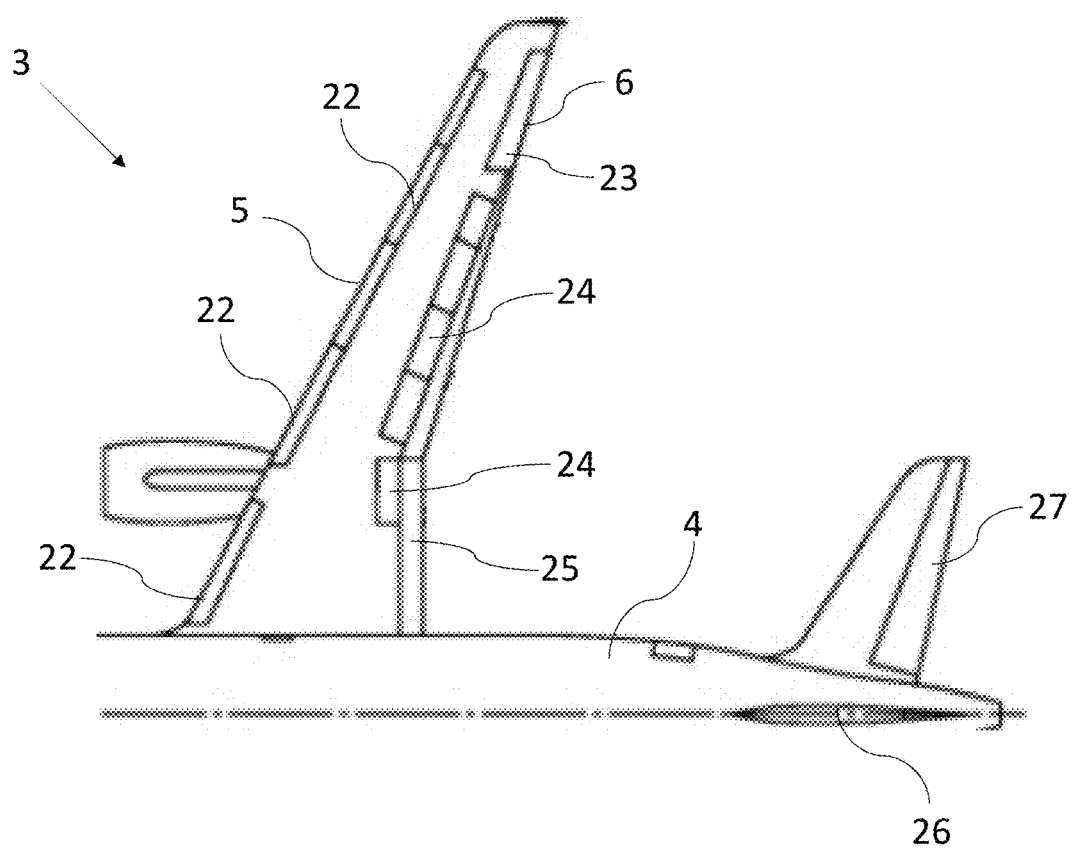
FIG. 2 shows a starboard portion of the aircraft.

As shown in FIG. 2, the aircraft 1 can include a number of flight control surfaces, such as leading-edge slats 22 distributed along the span of the wing 3 adjacent to the leading edge 5, an aileron 23 towards an outboard section of the trailing edge 6, air brakes/spoilers 24 provided across an upper surface of the wing 3 towards the trailing edge 3 b, a set of flaps 25 adjacent the trailing edge 6 of the wing 3, and a rudder 26 and elevators 27 positioned on the tail of the fuselage 4.

Flight control surfaces are adjustable during flight to adjust the aircraft flight altitude or wing performance by controlling the airflow over the wings 2,3. For example, ailerons may be used to tilt the wings 2,3 to control the roll of the aircraft, while high lift devices (such as slats, flaps) may be used to increase the lift coefficient of the wings 2,3 at lower speed (such as take-off) or reduce the landing speed. Whilst the aircraft 1 is shown with a particular quantity and configuration of control surfaces, it will be understood that the wings 2, 3 may comprise a different number and/or arrangement of control surfaces.

Figure 3:
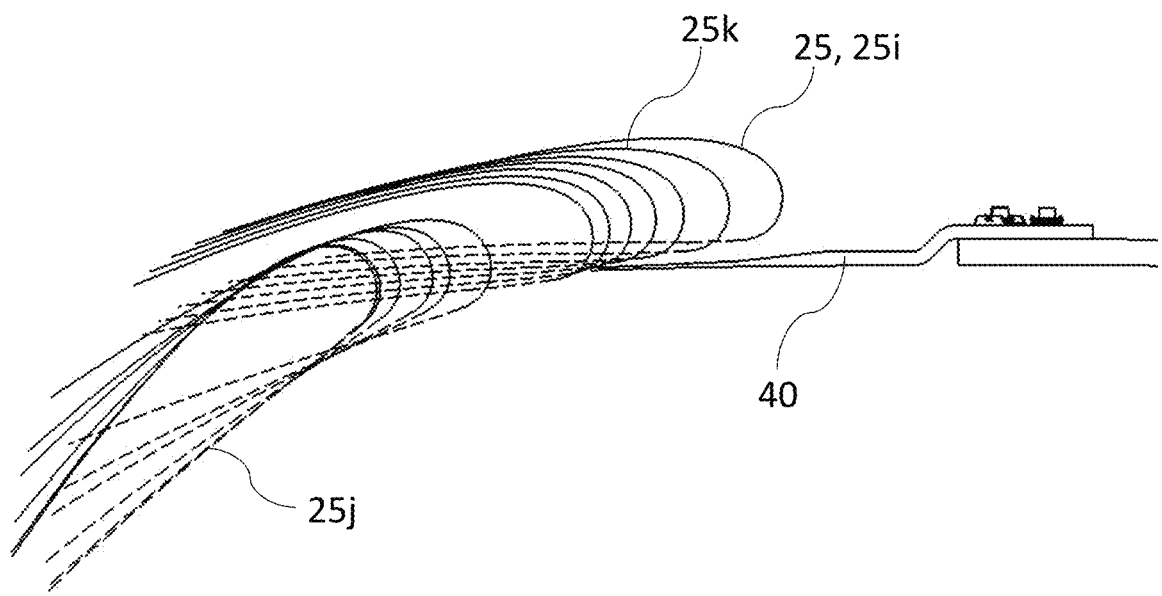
FIG. 3 shows a control surface in various deployed and retracted configurations.

FIG. 3 shows an aircraft assembly including a flap 25 moveable between a retracted configuration 25i and a deployed configuration 25j, with several intermediate configurations 25k therebetween (only one of which is labelled).

During deployment of the flap 25, a relatively large space opens up forward of the control surface. As shown in FIG. 3, a panel 40 may extend over this space to separate the space from the external flow stream surrounding the aircraft 1. However, the kinematics of the flap 25 can be complex such that a gap is formed between the panel 40 and the flap 25 in some configurations, such as in the retracted configuration 25i shown in FIG. 3.

In cruise, the flaps 25 of the aircraft 1 will typically be in the retracted configuration 25i. The reduction of drag in cruise is an important design factor, and therefore the gap is ideally minimised in this flight phase, and preferably the panel 40 forms a seal with the underside of the flap 25.

To close this gap, the panel 40 is formed as a flexible panel 40 that can undergo sufficient bending in flight, due to the aerodynamic forces acting upon it, to close the gap to the flap 25, for instance in cruise. This avoids the alternate solution of altering the travel of the flap 25 itself or providing a rigid panel that fails to reduce the size of this gap.

In the present arrangement, without carefully constraining the movement of the flexible panel 40, the flexible panel 40 may move to a position that interferes with the path of the flap 25, for instance when moving from the flap 25 from the deployed configuration 25j to the retracted configuration 25i. In this instance, the flap 25 may clash with the flexible panel 40 due to the unconstrained upwards bending of the flexible panel 40. The movement of the flexible panel 40 may also interfere with other internal components of the aircraft 1 and aerodynamic performance.

In these situations, the flexible panel 40 may be carefully tailored in terms of its material, structure, and attachment to the surrounding structure to better tailor the flexibility of the panel 40. However, this can impose significant design constraints on the flexible panel 40.

In order to manage the movement of the flexible panel 40, a rigid stopper 50 is provided that is configured to restrict bending of the flexible panel 40. In particular, the rigid stopper 50 is configured to restrict bending of the flexible panel 40 in a first direction and permit bending of the flexible panel 40 in a second direction opposing the first direction.

Figure 4:
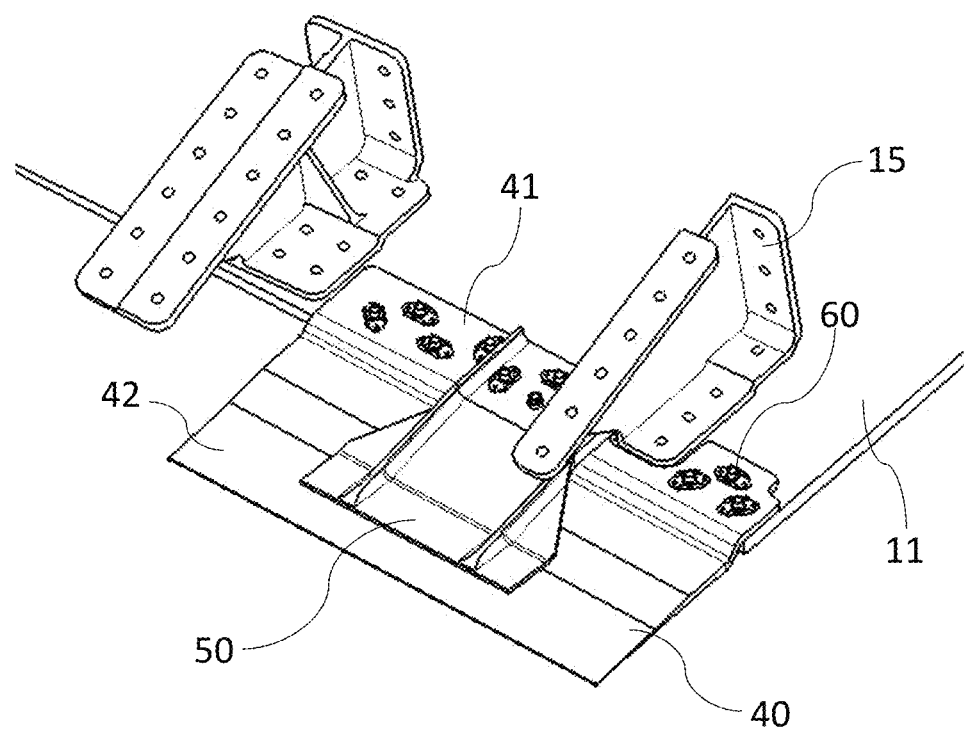
FIG. 4 shows an aircraft assembly according to an example of the invention.

An example of the aircraft assembly including the flexible panel 40 and rigid stopper 50 is shown in FIG. 4.

The flexible panel 40 is attached to an outer aerodynamic skin panel 11 of the wing 2 at one end, such that the flexible panel 40 has a supported end 41 at which the flexible panel 40 is fixedly attached to the skin panel 11 and a tip region 42 of the flexible panel 40 away from the supported end 41. In this manner, the flexible panel 40 can bend about the supported end 41. It will be understood that the flexible panel 40 is supported only at the supported end 41, such that all edges of the flexible panel 40 away from the supported end 41 are unsupported edges. The flexible panel 40 thereby acts as a cantilever beam that can rotate about the supported end 41.

The supported end 41 may extend along a generally span-wise direction of the wing 2, 3, with the tip region 42 of the flexible panel 40 extending away from the supported end 41 in a generally chordwise direction.

Figure 5:
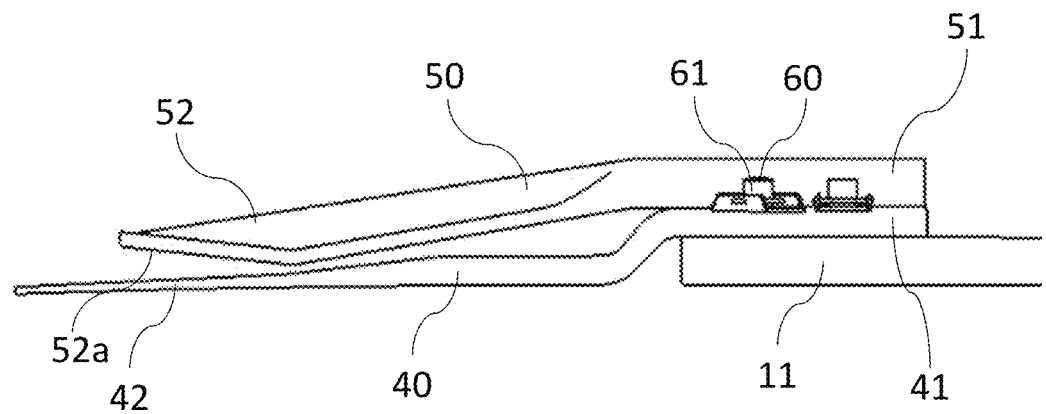
FIG. 5 shows a flexible panel of the aircraft assembly in a nominal, undeformed configuration.
Figure 6:
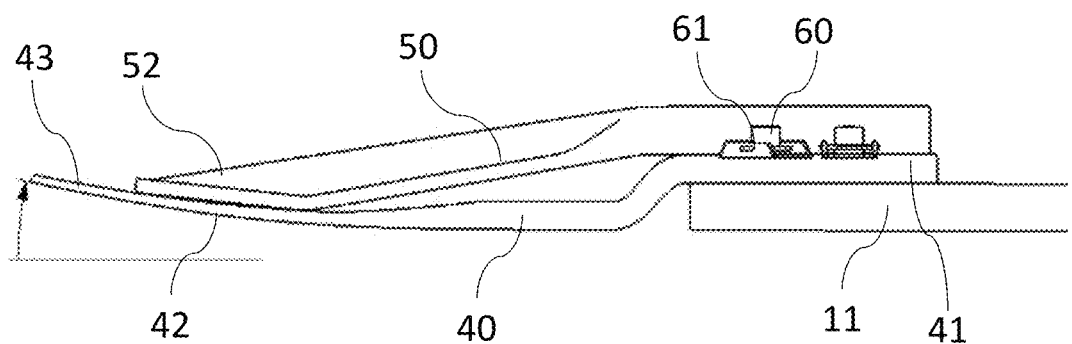
FIG. 6 shows the flexible panel in a deformed configuration in which the flexible panel is bent towards a rigid stopper of the aircraft assembly.
Figure 7:
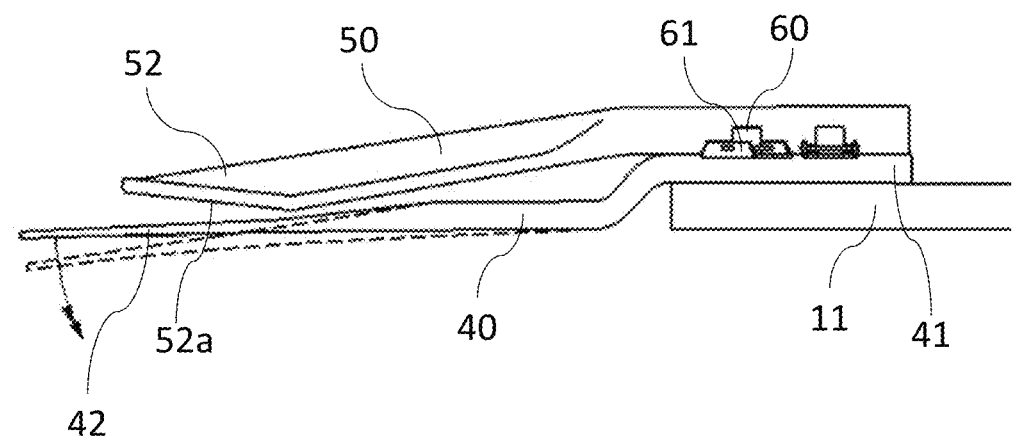
FIG. 7 shows the flexible panel in a deformed configuration in which the flexible panel is bent away from the rigid stopper.

The flexible panel 40 will typically form an outer aerodynamic surface of the aircraft 1, such that a continuous aerodynamic surface with the adjacent outer aerodynamic skin panel 11 is desired, such as shown in FIGS. 5 to 7. Attaching the flexible panel 40 directly to the outer aerodynamic skin panel 11 makes alignment of the outer aerodynamic surfaces easier to the two panels 11, 40 due to both panels 11, 40 being able to use a common datum.

The flexible panel 40 may be fastened to the outer aerodynamic skin panel 11 using a plurality of fasteners 60. The fasteners 60 allow the flexible panel 40 to be releasably attached to the skin panel 11, which can ease installation of the flexible panel 40 as well as make repair and replacement of the flexible panel 40 easier.

The rigid stopper 50 is attached to the flexible panel 40, such that the rigid stopper 50 is fixed relative to the outer aerodynamic skin panel 11. The rigid stopper 50 is positioned on the flexible panel 40 at the supported end 41 and extends across the flexible panel 40 towards the tip region 42 of the flexible panel 40. The rigid stopper 50 is elongate, extending from a supported end 51 to a tip region 52. The rigid stopper 50 is generally centrally located relative to the flexible panel 40, such that a center of the supported end 51 of the rigid stopper 50 is substantially aligned with the supported end 41 of the flexible panel 40.

The tip region 52 extends so as to be located adjacent the tip region 42 of the flexible panel 40 and is arranged to block bending of the flexible panel 40 inwards towards the internal structure of the aircraft 1 whilst providing no constraint on the outwards bending of the flexible panel 40. In particular, the tip region 52 of the rigid stopper 50 sits adjacent an inner surface of the flexible panel 40 and has an abutment surface 52a that is arranged to abut the flexible panel 40 and set an upper limit on, or in some examples entirely prevents, any inward bending of the flexible panel 40.

The rigid stopper 50 may be attached to the outer aerodynamic skin panel 11 by a plurality of fasteners 60. The fasteners 60 allow the rigid stopper 50 to be releasably attached to the outer aerodynamic skin panel 11, which can ease installation of the flexible panel 40 as well as make repair and replacement of the rigid stopper 50 easier, for instance a rigid stopper 50 may be retrofitted to an existing aircraft 1 to tailor the bending behaviour of a flexible panel 40, as will be discussed further below.

The rigid stopper 50 may be attached to the outer aerodynamic skin panel 11 using the same plurality of fasteners 60, such that at least some fasteners 60 extend through both the flexible panel 40 and rigid stopper 50. This can allow the flexible panel 40 and rigid stopper 50 to be installed as simultaneously, and in some examples as a single unit.

Each fastener 60 has a fastener head 61. The fastener head 61 may be arranged to abut the rigid stopper 50, such as shown in FIGS. 5 to 7, such that the shank of the fastener 60 extends through the rigid stopper 50 prior to extending through the flexible panel 40. By abutting the fastener head to a surface of the rigid stopper 50, rather than the flexible panel 40, the rigid stopper 50 can be removed from the aircraft 1 without requiring the flexible panel 40 to be removed. This can help with access and removal of the rigid stopper 50 in the event that the rigid stopper 50 is to be repaired, modified, or replaced.

The flexible panel 40 and rigid stopper 50 in the present example are attached to an outer aerodynamic skin panel 11, however it will be appreciated that one or both may alternatively be attached to any other suitable part of the aircraft structure. FIG. 4 shows a trailing edge rib portion 15 that may form a suitable aircraft structure for attaching the flexible panel 40 and rigid stopper 50, although other sections of the rib, spar, or fuselage frame may form suitable attachment points.

In the absence of any external forces, the flexible panel 40 will be in an undeformed configuration, such as shown in FIG. 5. The portions of the flexible panel 40 away from the supported end 41 are spaced from the rigid stopper 50 such that a gap is provided therebetween. This gap allows the flexible panel 40 to bend passively, for example under the influence of external forces such as aerodynamic loads, towards the rigid stopper 50.

Upon a force acting on the flexible panel 40, the flexible panel 40 can bend about the supported end 41 so as to move in a first direction towards the tip region 52 of the rigid stopper 50, as shown in FIG. 6. Upon contact with the rigid stopper 50, the rigid stopper 50 acts to prevent further bending of the flexible panel 40 in the first direction. This helps to control the inward bending of the flexible panel 40 so that interference and clashes with other components of the aircraft 1 can be mitigated or controlled.

It will be appreciated that in some examples the flexible panel 40 may extend further from its supported end 41 than the rigid stopper 50, such that a distal portion 43 of the flexible panel 40 is unrestrained by the rigid stopper 50. This can assist in allowing the distal portion 43 to engage with other aircraft components, such as the flap 25, to form a seal.

In some examples, the relative size of the distal portion 43 may be such that any additional bending of the flexible panel 40 is negligible or at least within a permissible range. In other examples, the rigid stopper 50 and flexible panel 40 may extend the same distance from the supported end 41 of the flexible panel 40 so as not to include a distal portion 43 that extends beyond the rigid stopper 50.

The rigid stopper 50 is arranged to restrict bending of the flexible panel 40 in only one direction (i.e. a first direction), such that the flexible panel 40 is free to rotate in a second direction, opposite to the first direction) without interference from the rigid stopper 50, such as shown in FIG. 7.

In the example shown in FIGS. 5 to 7, the flexible panel 40 decreases in thickness from the supported end 41 to the tip region 42, such that the thickness of the flexible panel 40 at the supported end 41 is greater than the thickness of the flexible panel 40 at the tip region 42. The variation in thickness across the flexible panel 40 can be utilised to tailor the bending behaviour of the flexible panel 40. Increased localised bending at the tip region 42 of the flexible panel 40 can help to form an improved seal with the flap 25, or other aircraft component.

As previously discussed, the flexible panel 40 has an undeformed configuration in which the tip region 42 of the flexible panel 40 opposite to the supported end 41 of the flexible panel 40 is spaced from the tip region 52 of the rigid stopper 50, such as shown in FIG. 5, although it will be appreciated that in some examples the flexible panel 40 may abut the rigid stopper 50 in the undeformed configuration. In other words, the tip region 42 of the flexible panel 40 may abut the tip region 52 of the rigid stopper 50.

Figure 8:
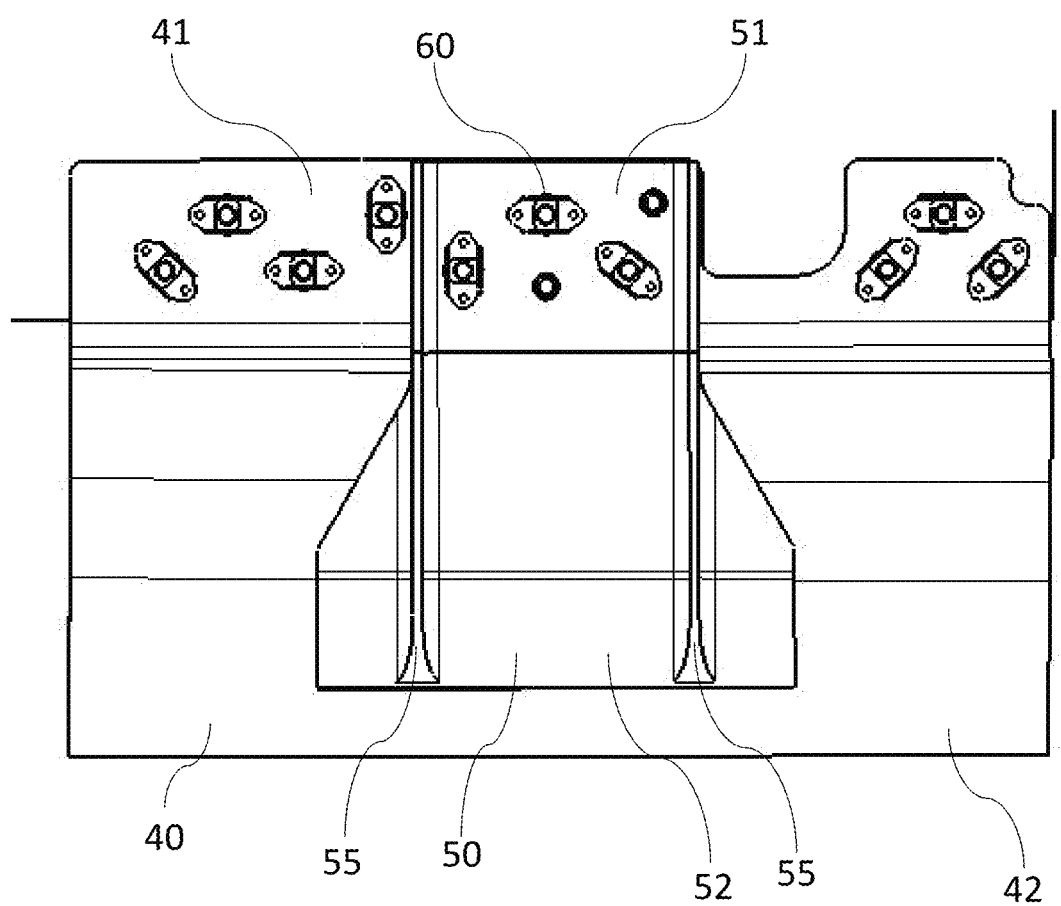
FIG. 8 shows a plan view of the aircraft assembly.

In order to strengthen the bending stiffness of the rigid stopper 50, whilst minimising any additional weight penalty of the rigid stopper 50, the rigid stopper 50 may include one or more reinforcement ribs 55. As shown in FIG. 8, the reinforcement ribs 55 extend away from the supported end 51 of the rigid stopper 50. In order to most effectively resist bending of the flexible panel 40, the reinforcement ribs 55 extend in a direction aligned with the bending axis of the flexible panel 40, i.e. from the supported end 41 of the flexible panel 40 to the tip region 42 of the flexible panel 40.

The rigid stopper 50 may have a surface area less than the surface area of the flexible panel 40, for example less than half the surface area. Similarly, the width of the rigid stopper 50 may be less than the width of the flexible panel 40, for example less than half the width. The rigid stopper 50 may have a width that increases towards the tip region 52, such that the width of the rigid stopper at the tip region 52 is greater than the width of the rigid stopper 50 at the supported end 51. The contact surface with the flexible panel 40 at the tip region 52 (i.e. abutment surface 52a) can thereby be increased to increase the effectiveness of the rigid stopper 50 in restricting bending of the flexible panel 40, whilst decreasing the weight penalty of the rigid stopper 50 at the supported end 51.

It will be clear to the skilled person that the examples described above may be adjusted in various ways. For example, the flexible panel 40 may be curved or otherwise profiled such that the aerodynamic surface of the flexible panel 40 is non-planar.

The rigid stopper 50 has a substantially planar abutment surface 52a configured to abut the flexible panel 40, however it will be appreciated that the abutment surface 52a may be non-planar. For instance, the abutment surface 52a may have curvature, or other profile, configured to correspond to that of the portion of the flexible panel 40 that the abutment surface 52a is arranged to contact.

In the present example, the flexible panel 40 and rigid stopper 50 are discussed as part of an aircraft assembly including a flap 25, with the flexible panel 40 and rigid stopper 50 arranged to ensure operational efficiency of the flap 25. Although it will be appreciated that the flexible panel 40 and rigid stopper 50 arrangement can be advantageous when used in the context of a range of moveable device on an aircraft 1. Flaps 25 and slats 22 are examples of control surfaces that are retracted in cruise, and thereby may find particular benefit in the present arrangement. Although the moveable device may be any moveable control surface on an aircraft 1, or other moveable structure, in which there is a need to constrain the bending of an adjacent flexible panel 40. Examples of suitable moveable structures can include external doors and access hatches.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft assembly comprising:
an aircraft structure;
a flexible panel having a supported end, by which the flexible panel is fixedly attached to the aircraft structure, and an unsupported end that extends away from where the supported end of the flexible panel is attached to the aircraft structure, wherein the flexible panel is configured to bend, about the supported end thereof, relative to the aircraft structure;
a rigid stopper that comprises a supported end, by which the rigid stopper is fixedly attached to the aircraft structure, and an unsupported end that extends away from and fixedly where the supported end of the rigid stopper is attached to the aircraft structure;
wherein the rigid stopper is configured such that:
when the unsupported end of the flexible panel bends in a first direction towards the unsupported end of the rigid stopper, the unsupported end of the flexible panel contacts the unsupported portion of the rigid stopper, which restricts bending of the flexible panel about the supported end of the flexible panel in the first direction;
when the unsupported end of the flexible panel bends in a second direction, which is opposite the first direction, away from the unsupported end of the rigid stopper, the unsupported end of the flexible panel is spaced apart from and does not contact the unsupported end of the rigid stopper, such that the rigid stopper permits bending of the flexible panel in the second direction; and
comprising a moveable device for deploying relative to an outer aerodynamic skin panel of an aircraft, the moveable device having:
a retracted configuration, in which the moveable device contacts the flexible panel to form a seal therebetween; and
a deployed configuration, in which the moveable device is spaced from the flexible panel; wherein contact between the flexible panel and the moveable device in the retracted configuration is limited by the rigid stopper; and
wherein the moveable device is a control surface for an aircraft.

2. The aircraft assembly of claim 1, wherein the control surface is a flap or slat.

3. The aircraft assembly of claim 1, wherein the aircraft structure is an outer aerodynamic skin panel.

4. The aircraft assembly of claim 3, wherein the flexible panel forms a substantially continuous aerodynamic surface with the outer aerodynamic skin panel.

5. The aircraft assembly of claim 1, wherein, when the flexible panel is in an undeformed configuration, the unsupported end of the flexible panel is spaced apart from and does not contact the rigid stopper.

6. The aircraft assembly of claim 1, wherein the unsupported end of the flexible panel comprises a distal portion that extends beyond the unsupported end of the rigid stopper, such that the distal portion of the unsupported end of the flexible panel is unconstrained by any part of the rigid stopper.

7. The aircraft assembly of claim 6, wherein a direction of extension of the distal portion of the unsupported end of the flexible panel is in a longitudinal direction of the flexible panel, away from the aircraft structure.

8. The aircraft assembly of claim 1, wherein the rigid stopper is attached to the flexible panel.

9. The aircraft assembly of claim 1, wherein the rigid stopper is fastened to the aircraft structure using a plurality of fasteners.

10. The aircraft assembly of claim 9, wherein a center of the supported end of the rigid stopper is aligned with a center of the supported end of the flexible panel, relative to a width of the supported end of the flexible panel.

11. The aircraft assembly of claim 1, wherein the flexible panel and rigid stopper are fastened to the aircraft structure using a plurality of fasteners, each fastener extending through the flexible panel and rigid stopper.

12. The aircraft assembly of claim 11, wherein each fastener of the plurality of fasteners has a fastener head that abuts a surface of the supported end of the rigid stopper.

13. The aircraft assembly of claim 1, wherein the rigid stopper comprises one or more reinforcement ribs extending in a direction from the supported end of the rigid stopper towards and onto the tip region of the rigid stopper.

14. The aircraft assembly of claim 1, wherein the rigid stopper has a width that increases in a direction extending from the supported end of the flexible panel toward the unsupported end of the flexible panel, the unsupported end of the flexible panel being opposite the supported end of the flexible panel.

15. The aircraft assembly of claim 1, wherein the flexible panel deceases in thickness in a direction extending from the supported end of the flexible panel to a distal edge of the unsupported end of the flexible panel, the distal edge being opposite the supported end of the flexible panel.

16. An aircraft comprising the aircraft assembly of claim 1.

17. The aircraft assembly of claim 1, wherein a width of the rigid stopper is greater at a distal edge of the unsupported end of the rigid stopper than at the supported end of the rigid stopper.

18. The aircraft assembly of claim 17, wherein the rigid stopper has a thickness that tapers, such that the thickness of the rigid stopper at the supported end of the rigid stopper is greater than the thickness of the rigid stopper at the distal edge of the unsupported end of the rigid stopper.

* * * * *